(12) United States Patent
Anderson

(10) Patent No.: US 6,587,094 B2
(45) Date of Patent: Jul. 1, 2003

(54) TWO-SIDED INPUT DEVICE FOR A COMPUTER-RELATED APPARATUS

(75) Inventor: Glen J. Anderson, Sioux City, IA (US)

(73) Assignee: Gateway, Inc., North Sioux City, SD (US)

(*) Notice: Subject to any disclaimer, the term of this patent is extended or adjusted under 35 U.S.C. 154(b) by 0 days.

(21) Appl. No.: 09/362,006

(22) Filed: Jul. 27, 1999

(65) Prior Publication Data

US 2002/0067343 A1 Jun. 6, 2002

(51) Int. Cl.[7] .................................................. G09G 5/00
(52) U.S. Cl. ....................................... 345/168; 345/156
(58) Field of Search ................................. 345/156, 168, 345/163, 167; 341/21, 22

(56) References Cited

U.S. PATENT DOCUMENTS

| | | | |
|---|---|---|---|
| 3,940,758 A | * | 2/1976 | Margolin ..................... 345/169 |
| 4,032,931 A | * | 6/1977 | Haker .......................... 341/23 |
| 4,324,976 A | * | 4/1982 | Lapeyre .................. 235/145 R |
| 4,633,227 A | | 12/1986 | Menn |
| 5,136,694 A | | 8/1992 | Belt et al. |
| 5,198,991 A | | 3/1993 | Pollitt |
| 5,228,791 A | | 7/1993 | Fort |
| 5,278,779 A | | 1/1994 | Conway et al. |
| 5,457,452 A | | 10/1995 | Skovronski |
| 5,532,904 A | | 7/1996 | Sellers |
| 5,644,338 A | | 7/1997 | Bowen |
| 5,646,817 A | | 7/1997 | Manser et al. |
| 5,703,578 A | | 12/1997 | Allison |
| 5,706,167 A | | 1/1998 | Lee |
| 5,712,760 A | | 1/1998 | Coulon et al. |
| 5,733,056 A | | 3/1998 | Meagher |
| 5,734,548 A | | 3/1998 | Park |
| 5,865,546 A | * | 2/1999 | Ganthier et al. ............... 341/22 |
| 5,966,284 A | * | 10/1999 | Youn et al. .................. 361/680 |
| 6,014,604 A | * | 1/2000 | Kuroiwa et al. ............... 701/54 |
| 6,018,334 A | * | 1/2000 | Eckerberg et al. .......... 345/163 |
| 6,081,207 A | * | 6/2000 | Batio .......................... 341/20 |
| 6,215,419 B1 | * | 4/2001 | Leman ........................ 341/22 |

FOREIGN PATENT DOCUMENTS

| | | | |
|---|---|---|---|
| JP | 360095624 | * | 5/1985 |
| JP | 360114921 | * | 6/1985 |
| JP | 403111921 | * | 5/1991 |

OTHER PUBLICATIONS

IBM Technical Disclosure Bulletin; vol. 24, No. 1B, Page Number 714, Jun. 1981.*

* cited by examiner

Primary Examiner—Bipin Shalwala
Assistant Examiner—Ricardo Osorio
(74) Attorney, Agent, or Firm—Richard P. Gilly; Wolf, Block, Schorr and Solis-Cohen LLP

(57) ABSTRACT

A two-sided keyboard or other input/control device (19) has first and second keyboards (25, 29) mounted so that their respective keys face in substantially opposite directions. Each of the keyboards (25, 29) can correspond to a different need, user preference or computer application, including different language characters, different input controls, and different key configurations. The two keyboards are mounted in a single keyboard module (35) which can be flipped or rotated so that the desired keyboard faces up. In one preferred form, the keyboard module (35) plugs into a base (39). An electrical connector (51a, 51b) is provided for each of the keyboards (25, 29), so that the selected keyboard can be connected to a corresponding connector (49) on the base (39).

20 Claims, 3 Drawing Sheets

FIG. 4
FIG. 5
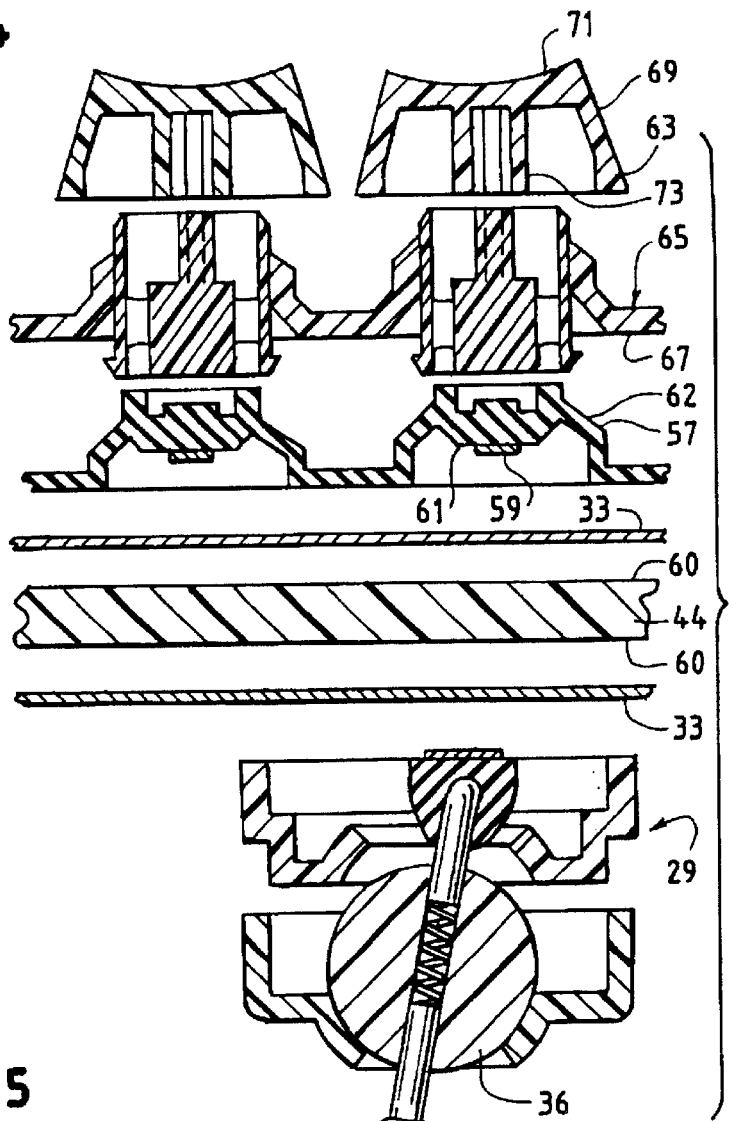
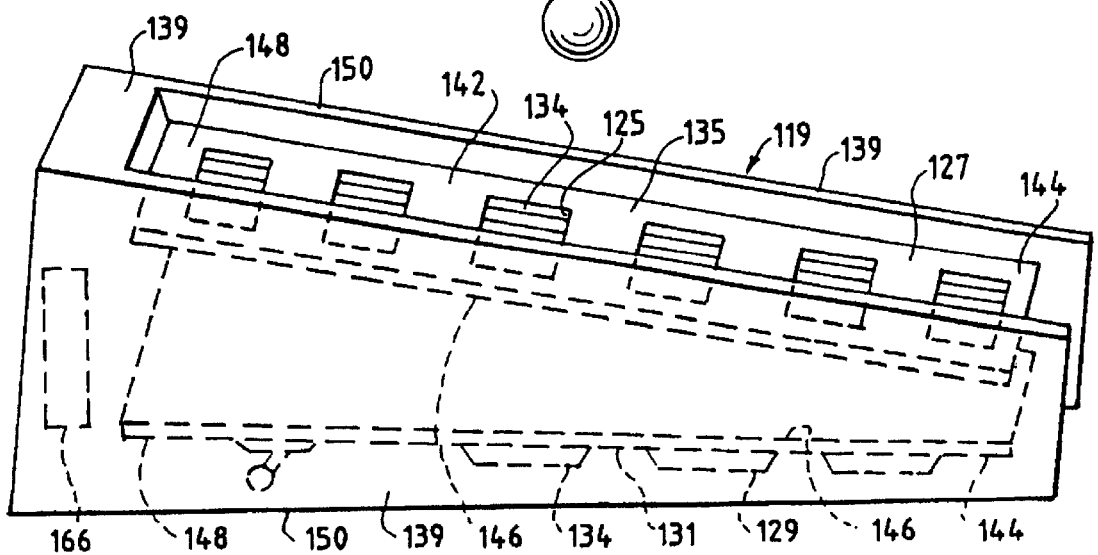

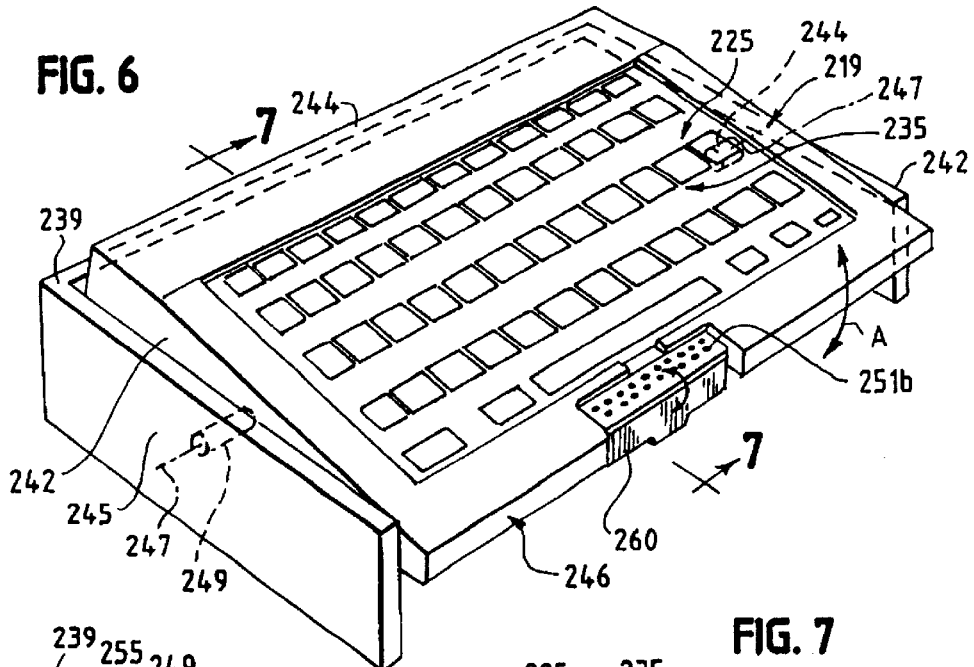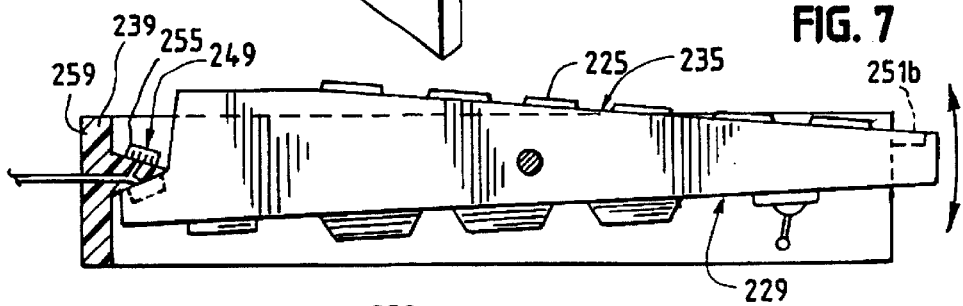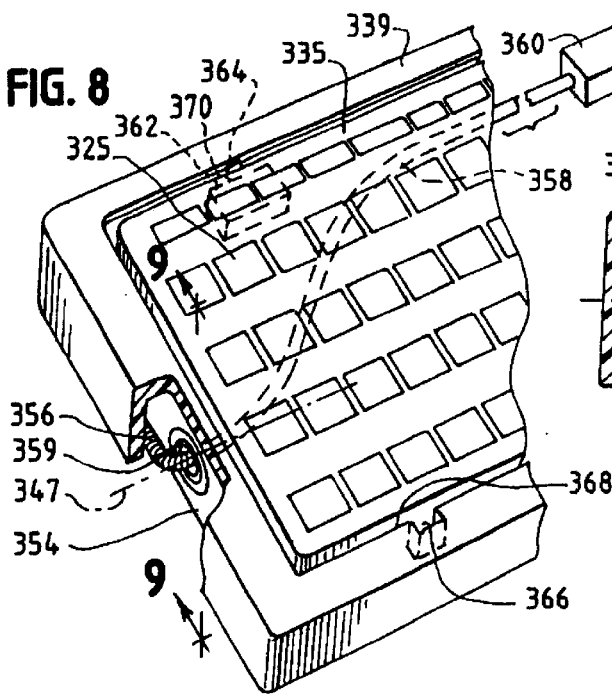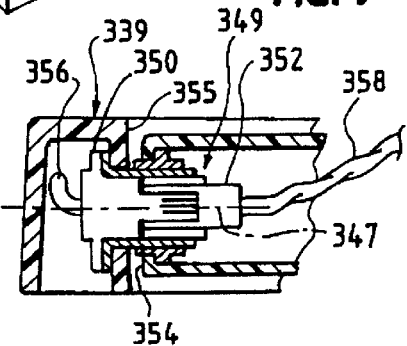

TWO-SIDED INPUT DEVICE FOR A COMPUTER-RELATED APPARATUS

FIELD OF THE INVENTION

This invention relates to input devices, such as keyboards for computers, and more particularly, to an improved keyboard having increased functionality.

BACKGROUND

As computer processing power increases, so do the complexity and number of associated software applications. Such computer applications, in turn, are increasingly associated with more involved and more numerous command sequences. For example, computer-aided design applications, which were once uniquely the province of so-called "main-frame" computers or other large systems, are now routinely available on personal computers and even laptops.

The increased complexity of software applications has generated a need for specialized inputs into such applications. For example, in today's highly interactive and realistic computer games and other entertainment applications, the user needs to drive, fly, or navigate a three dimensional world, often while warding off numerous assaults or pursuing desired treasure or quarry. Similarly, computer-related devices themselves are becoming more specialized tools, thus generating a corresponding need for specialized input devices.

As computers become more prevalent, certain users desire so-called "ergonomic" or other non-standard key layouts for the keyboards. Similarly, children and special needs individuals may require non-standard keyboards in order to effectively operate the associated computer-related device.

The continuing trend toward globalization often requires computer users to make use of foreign characters while operating computer applications. As the worldwide interconnection of computers increases, there will be a corresponding increased need to switch between character sets of different languages. This need is all the more acute in multinational enterprises needing to trade or communicate in local languages where business is being conducted.

The standard computer keyboard has sometimes been unable to address the above-described increases in application specialization and complexity. As a result, many advanced commands or functions are unduly involved, cumbersome to remember, or otherwise difficult to execute with a standard computer keyboard.

There have been various attempts to improve this situation, which have had mixed results. One approach of the current art is to increasingly place commands and functions on the graphical user interface, such as in the form of command buttons. To execute such commands, however, requires the user to remove his or her hand from the keyboard, grasp the mouse or other pointing device, move the cursor to the desired command button, "click" the activation button on the mouse a requisite number of times, and only after this sequence can the user return his or her hand to the keyboard for further processing. This sequence can undesirably interrupt the flow of operating the application, playing the computer game, etc.

Another approach has been to create specialized keyboards for specialized applications. For example, computer game systems or computer games running on a personal computer often assemble joysticks, triggers, firing buttons and other input devices on a special "game keyboard" dedicated specifically to the operation of the corresponding computer game.

Other specialized computer-related devices come equipped with their own distinctive input controls or keyboards. Examples of this trend include keyboards for navigating the World Wide Web, or those associated with personal digital assistants. A related approach is disclosed in U.S. Pat. No. 5,136,694 (Belt) which discloses a circuit for switching between the built-in keyboard, such as in a laptop, and the "full function" keyboard typically associated with a desktop computer.

The foregoing approaches disadvantageously require the purchase of a second or specialized keyboard or keyboard add-ons, separate from a standard keyboard. Such additional purchases not only take up space, but the user needs to remember where the additional keyboards are stored, so they can be accessed when the appropriate application is utilized.

Another approach is disclosed in U.S. Pat. No. 4,633,227 (Menn), which discloses a programmable keyboard in which a standard configuration of keys can be associated with two or more sets of characters. In order to activate an alternative character set, the user must go through the time and trouble of reprogramming the keyboard. Another disadvantage of this approach is that the key configurations must remain in the standard computer keyboard layout. As a result, the alternate character sets generally cannot have more characters than does English without resorting to cumbersome improvisations to include the additional characters. This makes keyboards for Kanji, Russian, and other non-Roman alphabet languages generally awkward to use. Furthermore, other specialized needs, such as those associated with computer games, cannot generally be configured within the confines of a standard keyboard.

There is thus a need for a keyboard or other input device with the flexibility to accommodate the increased complexity and specialization of today's and tomorrow's computer applications.

There is a further need for this flexibility not only to be relatively straightforward to implement by the user, but also relatively economical.

There is a still further need for a single keyboard unit to be readily selectively usable in a first standard configuration and a second, specialized configuration for particular applications.

SUMMARY OF THE INVENTION

A two-sided input device is useful for operating corresponding software applications on a computer-related apparatus. A generally planar module of the device has two sets of input controls mounted to opposite planar surfaces of the module. Each set of input controls is sufficient to operate a corresponding set of software applications on the computer-related apparatus. The user can select which set of input controls he or she wishes to use, and position the selected set in an accessible position. While the selected set is being used, the other set is inactive and relatively inaccessible. The input controls which are accessible to the user are electrically connected to the computer-related apparatus. In this way, movements of the input controls are transmitted to the computer-related apparatus.

In accordance with another aspect of the current invention, the two-sided input device comprises a two-sided keyboard and the computer-related apparatus comprises a personal computer. The keyboard module is received in a base and the selected keyboard is electrically connected to the base, which in turn is electrically connected to the computer.

In one preferred form, the keys of one of the keyboards include alphanumeric keys, function keys, scroll keys, keys for moving the cursor within the screen, and a cursor control device, such as a mouse or trackball. The other keyboard can be a less-standard arrangement or selection of keys and other input controls, such as might be useful for a computer game, special needs individuals, children, or for specialized applications and foreign languages.

BRIEF DESCRIPTION OF THE DRAWINGS

The invention will be better understood by reference to the attached drawing. It is understood that the drawing is for illustrative purposes only and is not necessarily drawn to scale. In fact, certain features of the drawing are shown in more detail for purposes of explanation and clarification.

FIG. 4 is an enlarged, partial, exploded, side sectional view of the keyboard module of FIG. 2;

FIG. 5 is a perspective view of a first alternative embodiment of an input control device according to the present invention;

FIG. 6 is a perspective view of a second alternative embodiment of an input control device according to the present invention;

FIG. 7 is a side elevational view of the keyboard of FIG. 6;

FIG. 8 is a perspective, partial view of a third alternative embodiment of an input control device according to the present invention; and FIG. 9 is a partial, sectional view of the embodiment of FIG. 8.

DESCRIPTION OF THE PREFERRED EMBODIMENTS

Figure 1:
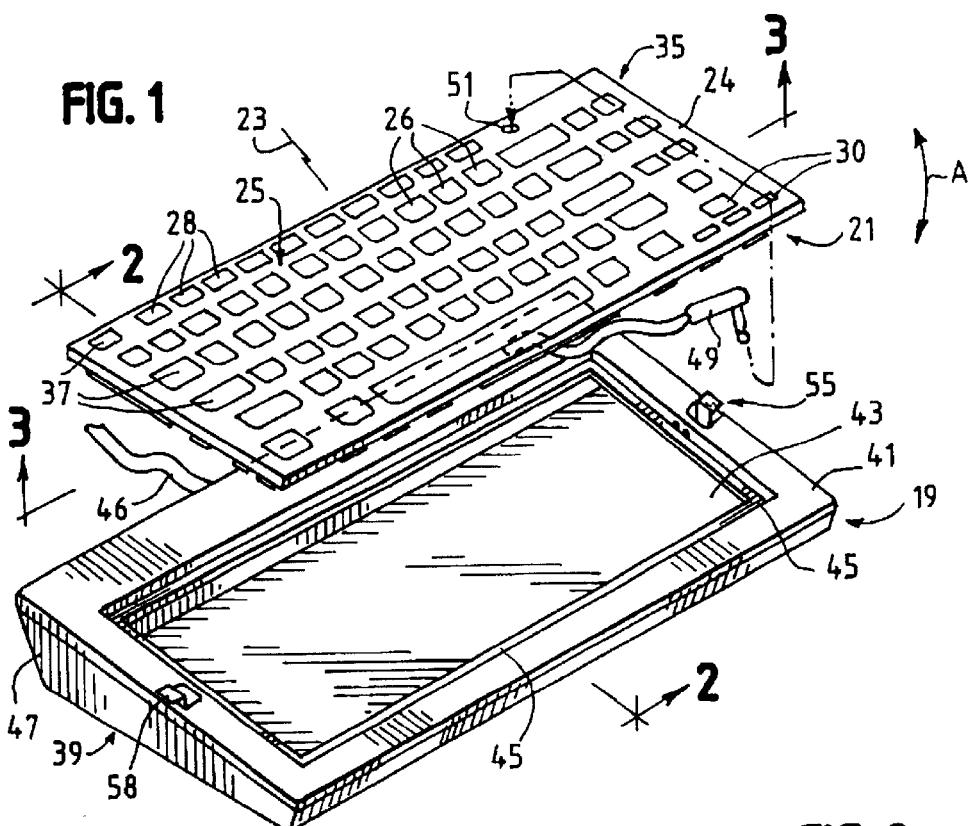
FIG. 1 is an exploded, perspective view of a computer-related apparatus and associated input device in the form of a keyboard according to the present invention.
Figure 2:
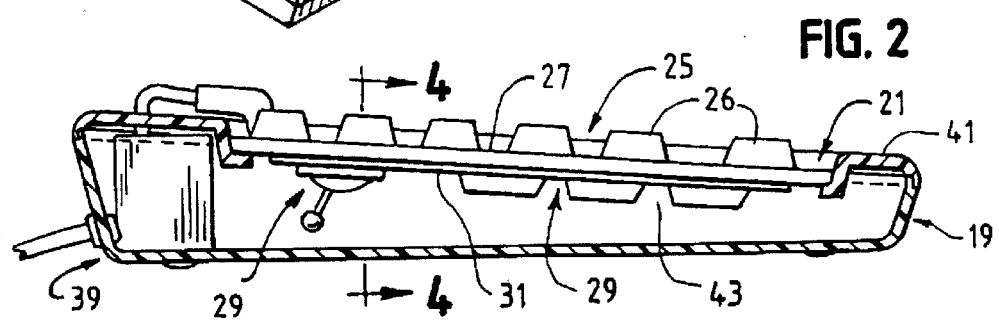
FIG. 2 is a side sectional view of the keyboard of FIG. 1.

Referring now to the drawing, and in particular to FIGS. 1–4, a two-sided input device 19 in the form of a keyboard 21 is shown in conjunction with a computer-related apparatus, such as the personal computer shown schematically at 23. Input device 19 has a first set of input controls 25 movably mounted on and extending outwardly from a corresponding surface 27, and a second set of input controls 29 movably mounted on and extending outwardly from an opposite surface 31. Input controls 29 in the illustrated embodiment are in the form of alphanumeric keys 26, function keys 28, and cursor control keys 30. However, the term "input controls," as used herein is not limited to keys on a keyboard, but rather is a broad term encompassing any of the myriad expedients for a user to input data or commands into the device 19, including a mouse, trackball, touchpad, joystick, button, and the like.

As best seen in FIG. 4, suitable circuitry, preferably in the form of circuit boards 33, is operatively connected to input controls 25, 29 and mounted to a substrate 44. As such, the first and second sets of input controls 25, 29, circuit boards 33 connected thereto, and substrate 44 together comprise a generally planar keyboard or input control module 35, which the user can flip in the directions of arrows A, so that the desired set of input control sets 25, 29 is facing upward and is thus accessible, while the other set is facing away from the user and is less accessible. In this way, a user can easily switch between two, alternate sets of input controls, one set being suitable for a first set of applications, and the other set being more appropriate for a second set of applications or a second user.

Figure 3:
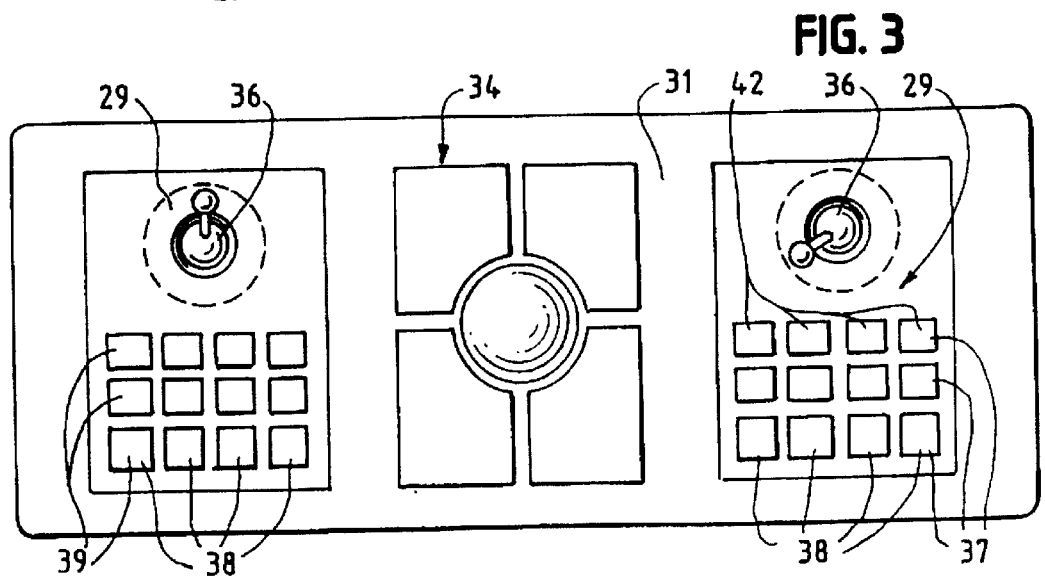
FIG. 3 is a bottom plan view of the keyboard of FIGS. 1 and 2.

Input control set 25 is a relatively standard QWERTY keyboard with cursor movement keys 30 and function keys 28, discussed above. In contrast, however, as seen in FIG. 3, set 29 of input controls is a specialized keyboard 34 suitable for one or more computer games. As such, keyboard 34 includes a trackball 32, joysticks 36, navigational controls 38, hot keys 40, and firing buttons 42. Significantly, each of the sets 25, 29 has a sufficient number of input controls 37 to operate corresponding software applications running on personal computer 23.

Irrespective of which set of input controls 25, 29 is facing toward the user, module 35 rests on base 39 during use. In this embodiment, base 39 has a generally rectangular footprint to give input device 19 the required stability, and an upper surface 41 which slopes downwardly to one longitudinal side so that input control module 35 is slightly tilted toward the user. A cavity 43 is defined in upper surface 41 and is bounded by outwardly oriented edges 45. Module 35 is physically supported on at least portions of outwardly oriented edges 45 and, in such position, the bottom-facing set of input controls 29 extend partly into cavity 43 (FIG. 2) and are therefore hidden by perimeter wall 47 of base 39.

A pair of mating connectors 49 and 51 electrically connects module 35 to base 39. Each set of input controls 25, 29 has a corresponding female connector 51 (one of which is shown). Electrical connector 49 is secured to base 39 and is received in the selected one of connectors 51. Base 39, in turn, has a suitable electrical connection 46 to the personal computer 23. Thus, whichever set of input controls 25, 29 is being used can be connected to computer 23.

Module 35 is preferably formed of relatively thin keyboard subassemblies, such as those frequently found on laptop computers. In this way, the overall thickness of module 35 is minimized. Base 39 optionally includes means for holding module 35 in position, here shown as a plurality of latches 55. Module 35 is secured adequately to base 39 when snapped into place so that latches 55 engage the outwardly-facing surface 27 or 31 of module 35.

Although the various input controls 37 can be operatively connected to circuit boards 33 by any suitable means, one preferred structure is shown in FIG. 4 for a subset of alphanumeric keys 26 and one of the joysticks 36. One circuit board 33 is secured to a corresponding one of the opposite surfaces 60 of substrate 44. A resilient layer 57 is disposed on the surface of each circuit board 33 and positioned so that contacts 59 formed on underside 61 of resilient layer 57 are positioned over appropriate conductive portions of circuit boards 33. Resiliently compressible layer 65 is in turn disposed over resilient layer 57. Underside 67 of layer 65 is suitably formed to mate with topside 62 of resilient layer 57. Key caps 69 have upper surfaces 71 which are contacted by the user, and undersides 73 which mate with top sides 66 of resilient layer 65. The resulting multi-layer structure provides for the appropriate electrical connection to be made with circuit board 33 while at the same time providing the desired tactile feedback. Circuit boards 33 are equipped with suitable electronics for detecting movements of the input controls. When input controls are activated, such movements are transmitted via circuitry and electronic components on the appropriate circuit board 33 through base 39 and into the chassis of personal computer 23.

It will be appreciated that the sets of input controls 25, 29 of module 35 can assume a wide variety of configurations and combinations depending on the intended applications and the needs of the anticipated users. In one alternative to that illustrated and discussed above, input control sets 25, 29 can correspond to two alphanumeric keyboards for two different languages. As further alternatives, the sets of input controls 25, 29 can include an ergonomic keyboard, a keyboard for special needs individuals, a keyboard specially configured for browsing on a computer network, or a keyboard with large-key or picture-key configurations for children.

The operation of the two-sided keyboard of the present invention is apparent from the foregoing description. When the user wishes to switch to the bottom-facing, inaccessible keyboard, to run a particular application or game, for example, the user first undoes latches 55, if base 39 has been so provided. Connector 49 is disconnected from the connector 51 of the keyboard which was previously being used. Keyboard module 35 is then separated from base 39, flipped over so that the keyboard previously received in cavity 43 is now facing up, and then replaced on base 39. In this position, the keyboard previously hidden is now accessible, and the one previously accessible is now hidden. The connector 49 is reinserted into the connector 51 corresponding to the upward facing keyboard, and the user can input data or transmit commands to computer 23 from the new, accessible keyboard. The hidden keyboard is no longer electrically connected to the computer 23, so false activation of its keys cannot occur. There is no need to alter the connection between base 39 and computer 23 during the foregoing operations.

There are alternative ways to support module 35 relative to the user. One such alternative is shown in FIG. 5. Instead of a separate base 39, module 135 has a substantially rigid member 139 located at both, opposite ends 142 and rear 143 of module 135. The two keyboards 134 of module 135 are mounted relative to each other so as to be substantially back-to-back. The term "substantially back-to-back," as used with reference to this embodiment, means that back surfaces 146 oppose each other but may optionally be tilted relative to each other so that forward edges 144 of respective keyboards 134 are closer to each other than corresponding rear edges 148. This substantially back-to-back configuration has the advantage of tilting the upper keyboard 134 toward the user, as made more apparent below.

Rigid member 139 extends outwardly from keyboard surfaces 127, 131 and terminates in respective, outer edges 150 which follow the general tilt of keyboard surfaces 127, 131. The resulting two-sided input device 119 rests on the downwardly facing outer edges 150, thereby holding the upwardly facing set of input controls 125 or 129 in a relatively stable position for use. Preferably, rigid member 139 extends sufficiently so that outer edges 150 are equal to or greater than the corresponding, outward extension of the input controls from surfaces 127, 131. In this way, rigid member 139 keeps the input controls of the bottom-facing keyboard from contacting the surface on which two-sided input device 119 rests.

In order to electrically connect only the upwardly facing keyboard to the computer related apparatus, a gravity switch 166 is operatively connected to corresponding sets of input controls 125, 129. Gravity switch 166 functions in a manner known in the art, that is, it responds to rotation of module 135 to activate that set of input controls which is in the upwardly-facing, accessible position.

The user selects the keyboard he or she wishes to use by flipping the device 119 to place the desired keyboard in the upwardly facing position.

A second alternative embodiment of the present invention, shown in FIGS. 6 and 7, includes a peripheral bezel 239 which extends along top and side edges 244, 242, respectively, of module 235. As in the previous alternative embodiment shown in FIG. 5, peripheral bezel 239 has a sufficient height to keep the bottom-facing set of input controls from encountering the opposing surface. Module 235 is rotatably mounted by any suitable means to opposite sidewalls 245 of peripheral bezel 239. A pivot axis 247 extends between the pair of mounting locations 249. The user pivots module 235 about pivot axis 247 in the directions shown by arrow B to place the desired set of input controls 225, 229 in the accessible position.

The two-sided input device 219 of FIGS. 6 and 7 has structures similar to the embodiment of FIGS. 1–4 for electrically connecting the desired set of input controls 225, 229 to the corresponding computer-related apparatus. In particular, a two-sided connector 249 extends from the back wall of bezel 239. Input controls 225 are connected to connector 251a defined at a suitable location in top edge 244 (as shown in FIGS. 6 and 7). Two-sided connector 249 has a downwardly facing pinset 257 which engages connector 251 to electrically connect set 225 of input controls as shown in FIGS. 6 and 7. Connector 251b is mounted at forward edge 246 (as shown in FIGS. 6 and 7) and connects to input controls 229. To connect the connector 251b to the two-sided connector 249, edge 246 is rotated upwardly in the direction of upward arrow B. Edge 244 is structured so that it slides past two-sided connector 249. After passing through an arc of about 180°, set 229 of input controls faces upwardly (not shown) and connector 251b is received in pins 255 of two-sided connector 249 to complete the required connection.

Connector 251b is equipped with a door 260, shown open in FIG. 6, which covers connector 251b when it is facing upwardly and not in use as in FIG. 6.

Operation of input control device 219 is apparent from the foregoing. The user rotates the keyboard module 235 in the directions of arrows B depending on which set of controls 225, 229 he or she wishes to activate. The module 235 is rotated until the appropriate connector 251a, 251b engages the corresponding pins of two-sided connector 249.

Yet another alternative embodiment of the present invention, shown in FIGS. 8 and 9, includes a rotatable module 335, similar to keyboard module 235 of the previous embodiment shown in FIGS. 6 and 7, but with an alternative means for connecting keyboard module 335 to peripheral bezel 339. In general terms, the embodiment illustrated in FIGS. 8 and 9 includes an electrical connector 349 which is located along pivot axis 347 of keyboard module 335. Electrical connector 349 is preferably a PS2 connector frequently used in keyboards. Electrical connector 349 has opposing male and female portions 350, 352 which are interconnected and extend between the bezel 339 on the one hand and an opposing one of the vertical walls 354 on the other hand.

A suitable electrical cable 356 extends from the male portion 350 of connector 349 to connect the keyboard module 335 to a computer-related device (not shown). A corresponding cable 358 extends from the female portion 352 of connector 349 and extends to keyboard module input 360 located in the upper right hand corner of keyboard module 335, as is often the case in standard keyboard configurations.

Suitable bores, one of which is shown at 359, are formed in the opposing vertical walls 354, 355 to enable the male and female portions 350, 352 of electrical connector 349 to be appropriately secured between bezel 339 and keyboard module 335. The bores 359 are axially aligned with pivot axis 347 and are equipped with suitable collars or shrouds so that module 335 rotates not only about pivot axis 347, but also about the axially aligned connector 349.

Significantly, cable 358 has sufficient slack between connector 349 and keyboard module input 360 so that keyboard module 335 is able to be rotated at least 180 degrees without causing cable 358 to bind or otherwise inhibit rotation of the keyboard module 335. In this way, it will be appreciated that keyboard module 335 can be of the two-sided variety as discussed above, and that one or the other of the keyboards can be rotated to the accessible, upper position for suitable input by a user.

In this embodiment, the means for detecting which side of keyboard module 335 is "active" includes a switch 362 with a button 364 extending outwardly and spring biased outwardly from active surface 370 of switch 362. In the position shown in FIG. 8, a relatively standard keyboard 325 is in the upper, accessible position, and button 364 of switch 362 is depressed by virtue of contact with an opposing portion of bezel 339. Conversely, when keyboard module 335 is rotated from its position shown in FIG. 8, button 364 ceases to be depressed, and extend outwardly by virtue of its spring bias. When keyboard module 335 is rotated about 180° from its position shown in FIG. 8, then keyboard 325 is in an inaccessible position, and the other keyboard (not shown) on the opposite face of module 335 faces upwardly. In this second position, the outwardly extending button 364 is received in its non-depressed state in cavity 366, which cavity is located in forward edge 368 of bezel 339. The extension of button 364 from its depressed to its non-activated or undepressed state, in turn, causes such other keyboard to become active and renders keyboard 325 inactive. It will be appreciated, that the spring-biased, depressible button 364 and corresponding cavity 366 can be replaced with other suitable switching means to make the upwardly facing keyboard active and render the downwardly facing keyboard inactive.

In addition to the advantages apparent from the foregoing description, the present invention makes two keyboards readily available to the user in a single unit, each keyboard having sufficient keys or other input controls thereon to operate a corresponding software application.

By maintaining two keyboards readily available, the disparate needs and desires of users and software applications can be more readily accommodated.

It is understood that the above-described preferred embodiments are but one illustration of the present invention, and that further alternative embodiments may be devised by those of ordinary skill in the art. Such alternatives, as well as others which skill or fancy may suggest, are considered to fall within the scope of the current invention, which is solely defined by the claims appended hereto.

What is claimed is:

1. A two-sided input device useful for operating corresponding applications on a computer-related apparatus, the device comprising:
    a generally planar module having first and second opposite planar surfaces defined therein;
    first and second sets of input controls movably mounted on and extending outwardly from the first and second surfaces, respectively;
    means for positioning a selected one of the sets of input controls in a more user-accessible position and the other of the sets in a less user-accessible position, wherein each of the sets of input controls has a sufficient number of the input controls to operate one of the corresponding applications on the computer-related apparatus;
    means for electrically connecting the selected one of the sets to the computer-related apparatus, whereby movements of the selected set of input controls are transmitted to the computer-related apparatus;
    electronic means operatively connected to the first and second sets of input controls for detecting movements of the input controls, whereby movements of the input controls are transmitted to the computer-related apparatus;
    a base with portions defining a cavity therein, the cavity bounded by outwardly oriented edges, wherein the module is removably received in the cavity and supported by the outwardly oriented edges, one of the sets of input controls being received in the cavity and thereby hidden in the base; and
    means for removably attaching the module to said base.

2. The device of claim 1, in which the computer-related apparatus is in the form of a personal computer with a computer monitor, and in which the applications display images on the monitor, wherein the input controls comprise at least one of: controls for moving the images, controls for navigating within the images, and controls for moving the cursor within the images.

3. The device of claim 2, wherein the controls comprise at least one of a trackball, a touch screen, a joystick, a mouse, and a keyboard.

4. The device of claim 1, wherein the means for electrically connecting the selected set of input controls comprises:
    first and second electrical connectors secured to the module and corresponding to respective ones of the input control sets; and
    means secured to the base for receiving and electrically connecting the electrical connectors of the selected set of input controls to the computer-related apparatus.

5. A two-sided keyboard for operating corresponding applications on a computer, the keyboard comprising:
    a keyboard module of generally planar configuration;
    first and second substantially planar, opposite surfaces defined in the keyboard module;
    a first and second set of keys movably mounted on and extending outwardly from the first and second surfaces, respectively, each set having a sufficient number of keys to operate at least one of the corresponding applications on the computer-related apparatus;
    electronic means operatively connected to the first and second set of keys for detecting movement of the keys;
    first and second electrical connectors secured to the keyboard module for the first and second sets of keys, respectively;
    a base with portions defining a cavity therein for receiving the keyboard module in the cavity, one of the sets of keys being received in the cavity and thereby hidden in the base;
    means secured to the base for receiving and electrically connecting a selected one of the electrical connectors, thereby electronically connecting the corresponding set of keys to the computer-related apparatus, whereby movements of the keys of the selected set of keys are transmitted to the computer-related apparatus; and
    means for removably attaching the keyboard module to said base.

6. The keyboard of claim 5, wherein one of the sets of keys comprises alphanumeric keys, function keys, scroll keys and keys for moving the cursor within the screen.

7. The keyboard of claim 5, wherein the first set of keys includes alphabetical characters of a first language and the second set of keys includes alphabetical characters of a second language.

8. The keyboard of claim 5, wherein one of the sets of keys is selected from the group consisting of an ergonomic keyboard, a keyboard for disabled individuals, and a keyboard having movement controls for browsing on a computer network.

9. The keyboard of claim 5, wherein one of the sets of keys includes keys specifically designated to perform functions of one of the corresponding software applications.

10. The keyboard of claim 9, in which the corresponding software application comprises a computer game, one of the surfaces of the keyboard having controls for playing the game mounted thereon.

11. The keyboard of claim 5, further comprising a cursor movement control on the first surface of the keyboard module.

12. The keyboard of claim 11, wherein the cursor movement control is selected from the group consisting of a trackball, a touchpad and a joystick.

13. A video game controller for operating corresponding games and other applications on a computer-related apparatus, the controller comprising:

a generally planar module having first and second opposite planar surfaces defined therein;

a first and second set of input controls movably mounted on and extending outwardly from the first and second surfaces, respectively, each set having a sufficient number of input controls to operate at least one of the corresponding games and other applications on the computer-related apparatus;

at least one of the sets of input controls comprising video game input controls specifically adapted to play a video game;

means for positioning a selected one of the sets of input controls in a more user-accessible position and the other of the sets in a less user-accessible position, electronic means operatively connected to the first and second set of input controls for detecting movement of the control, whereby movements of the input controls are transmitted to the computer-related apparatus;

first and second electrical connectors secured to the video game controller for the first and second sets of input controls, respectively; a base with portions defining a cavity therein for receiving the module in the cavity, one of the sets of input controls being received in the cavity and thereby hidden in the base; means secured to the base for receiving and electrically connecting a selected one of the electrical connectors, thereby electronically connecting the corresponding set of input controls to the computer-related apparatus, whereby movements of the input controls of the selected set of input controls are transmitted to the computer-related apparatus; and means for removably attaching the module to the base.

14. The video game controller of claim 13, wherein the video game input controls comprise at least one of the group consisting of keys, buttons, joysticks, trackballs, and touchpads.

15. The video game controller of claim 13, wherein the first set of input controls comprises video game input controls specifically adapted to play a video game, and the second set of input controls comprises alphanumeric keys, function keys, scroll keys and keys for moving a cursor on a screen of the computer-related apparatus.

16. The video game controller of claim 13, wherein the video game input controls include a cursor movement control on the first surface of the video game controller.

17. The video game controller of claim 16, wherein the cursor movement control is selected from the group consisting of a trackball, a touchpad and a joystick.

18. The video game controller of claim 17, in which the corresponding application comprises a computer game, the set of video game input controls including input controls for playing the computer game, the video game input controls being mounted on the first surface of the video game controller.

19. The video game controller of claim 13, further comprising means for removably attaching the keyboard module to said base.

20. The video game controller of claim 13, wherein the video game input controls consist of at least one of the group consisting of buttons, joysticks, and touchpads.

* * * * *